Patented July 20, 1926.

1,593,038

UNITED STATES PATENT OFFICE.

JOSEPH L. SILSBEE, OF SALT LAKE CITY, UTAH.

METHOD OF RECOVERING POTASSIUM CHLORIDE FROM BRINE.

No Drawing.     Application filed January 21, 1921. Serial No. 439,010.

This invention relates to a method of recovering potassium chloride from brine and pertains more particularly to the recovery of potassium chloride and magnesium chloride from brines of substantially the character described in my Patent No. 1,353,283, issued September 21st, 1920. Brines of that character occur in certain desert areas of the Western States.
They contain sodium chloride, potassium chloride and magnesium chloride in approximately the following proportions:

Sodium chloride, 314 grams per 1000 grams of water; potassium chloride, 23 grams per 1000 grams of water; magnesium chloride, 22 grams per 1000 grams of water; calcium sulphate, 5 grams per 1000 grams of water; magnesium sulphate, 3 grams per 1000 grams of water.
The present invention is also adapted to the economical and efficient recovery of potassium chloride from high magnesium chloride brines, from brines containing considerable percentages of calcium and magnesium sulphates, as well as to increase the percentage of potassium chloride that is directly recoverable from a low magnesium chloride brine.

In the method of my patent above referred to, the recovery of potassium chloride is accomplished by first evaporating the brine in solar ponds or vats to deposit sodium chloride and bring the residual liquor to or near the point of saturation with respect to potassium chloride. The liquor was then subjected to a further solar evaporation, depositing mixed crystals of sodium chloride and potassium chloride.

These crystals harvested and delivered to the refinery constituted the chief source of raw material from which the finished potassium chloride was obtained. The residual liquor of the second evaporation, containing a high perecentage of magnesium chloride, was available for further treatment for recovery of carnallite and commercial magnesium chloride.

In the foregoing method, which in many ways is entirely satisfactory and successful in practice on large scale production, the crude potassium chloride-sodium chloride salts resulting from the second solar evaporation are deposited in thin layers over the very considerable vat area required for their production. A considerable period of time must, however, elapse before a sufficient thickness has been obtained to warrant harvesting and meanwhile the whole area is subject to dilution by rains.

Heavy power-driven harvesting machinery is required in the solar vats to gather the crystals in winrows and pile them to drain, and heavy trucks, railways or other transportation facilities must be provided to move the required tonnage of harvested salts to the refinery.

The vat-handling and transporting costs of the crude salts, while not heavy as compared with the cost of prior methods, constitutes one of the principal items of expense in the production of potassium chloride by my method above referred to.

It is the purpose of my present invention to provide a method of potassium chloride and magnesium chloride recovery from brines of the same or similar characteristics as the brine above referred to, whereby the crude potash salts may be readily produced, handling costs may be saved, and the process of potassium chloride recovery expedited.

A further object is to accomplish the formation of the crude potassium chloride-sodium chloride salts, not by the method of direct solar evaporation, as in my previous patent, but by a new method that utilizes the magnesium chloride content of the final liquor of the process as a reagent to "force" or "salt out" and thereby deposit potassium chloride by replacement.

This "forcing out" or replacement process may be carried on at the refinery site, rendering it unnecessary to harvest the crude potassium salt crystals over a large area in the solar vats and to haul them to the refinery. Instead, it is only necessary in my present method to pump the mother liquor or potassium chloride saturated brine from the first or sodium chloride vats to the refinery and there to produce the crude salts of potassium chloride.

My present method, therefore, consists in first evaporating raw brine as heretofore, preferably in solar vats, depositing the sodium chloride crystals until the residual liquor has reached the stage of being practically saturated with respect to potassium chloride.

The potassium-saturated liquor is then pumped or otherwise conveyed to tanks and mixed with a concentrated magnesium chloride-bearing material (obtained from a later step hereinafter described), thereby forcing potassium chloride and sodium chloride out of solution, and depositing them as the solid crude crystalline potassium chloride-bearing material to be used in the subsequent refining process.

This crude crystalline material carries considerable adhering magnesium chloride liquor which is preferably removed by washing with the incoming potassium-saturated liquor from the sodium chloride solar vats. This potassium-saturated liquor contains a lesser amount of magnesium chloride than is contained in the liquor in which the crude potassium salt is formed. The liquor resulting from this washing operation is preferably then mixed with the concentrated magnesium chloride-bearing material, as above described.

After being thus washed to remove the adhering magnesium chloride liquor, the crude potassium salt is redissolved to obtain a hot saturated solution of potassium chloride, and the clear liquor is cooled to obtain high-grade potassium chloride crystals, substantially as described in my Patent No. 1,353,283.

It will be noted that the supply of replacement agent, viz, magnesium chloride, is a constituent of the original brine and is obtained in concentrated form by the evaporation of the liquor resulting from said mixture, and from which said crude potassium chloride salts have been removed. The evaporation of this liquor (resulting from the replacement mixture) will first produce a salt containing potassium and magnesium chlorides practically in the proportions of carnallite, and a residual liquor containing a high percentage of magnesium chloride. Continued evaporation of this residual magnesium chloride liquor will produce solid commercial magnesium chloride.

Any one of the above-mentioned forms of magnesium chloride, namely, artificial carnallite, or the mother liquor accompanying the production of artificial carnallite, or solid magnesium chloride, or any desired combination of the three, may be employed as the said replacement reagent.

A further step of my present method is to render the entire process less dependent upon weather conditions, to take the maximum advantage of those periods of time in which the solar evaporation is the greatest, and by concentrating the valuable potassium and magnesium liquors in smaller areas than was possible under my former method, eliminate to a great extent the serious effects and possibilities of dilution by rains. This is in part accomplished, as above described, by forcing or "salting" out of solution the greater percentage of the valuable potassium chloride contents of potassium chloride saturated brine from the first or sodium chloride vats as soon as that liquor is formed, and in part by spray evaporation.

The potassium chloride saturated brine from the first solar or sodium chloride vats may be concentrated quickly and in comparatively small areas by means of spray evaporation, but considerable mechanical difficulties are encountered in spraying such a liquor, because of its tendency to form hard crystals which clog and choke up the sprays.

The liquor resulting from the mixture of the potassium chloride saturated brine and the magnesium chloride-bearing material, on the other hand, contains a lower percentage of sodium and potassium chlorides and a higher percentage of magnesium chloride, and furthermore is capable of being successfully concentrated by spray evaporation, since there is little or no tendency for this liquor when sprayed to deposit hard crystals that interfere with the operation of the sprays.

The crystals formed by the evaporation of such a high magnesium chloride liquor are not only soft, but are of substantially the same specific gravity as the mother liquor in which they are formed, and consequently these crystals may be readily transported by pumping and may be piped or flowed to any point desired, thus rendering unnecessary the crude salt harvesting and transporting equipment that would otherwise be required, as in my former patented method above referred to. These crystals may be readily separated from the carrying liquor by settling or filtering.

In carrying out the replacement step of my present method the following proportions may be employed, although I do not desire to be understood as confining my invention to the exact proportions which are herein specified solely for the purpose of describing a preferred operation of my process.

By my present method the solar concentrated liquor from the first solar or sodium chloride vats, which liquor contains about 135 grams of magnesium chloride per 1000 grams of water, after being first used to wash the crude sodium-potassium salts obtained in a later step of the process, is then mixed with sufficient concentrated magnesium chloride material, obtained from a later step, to produce a liquor containing about 375 grams or in excess of 375 grams of magnesium chloride per 1000 grams of water.

A liquor containing 135 grams of magnesium chloride per 1000 grams of water and saturated in respect to both sodium and potassium chlorides will hold in solution approximately 125 grams potassium chloride at 77 degrees Fahrenheit, whereas a liquor containing 375 grams of magnesium chloride per 1000 grams of water and saturated in respect to both sodium and potassium chlorides will hold in solution but approximately 45 grams of potassium chloride at the same temperature.

The difference between these two solubilities of potassium chloride in the presence of varying quantities of magnesium chloride will, therefore, represent approximately the amount of potassium chloride forced or "salted out" of solution.

The crude potassium chloride salts thus obtained may be refined by methods described in my Patent No. 1,353,283.

The resulting liquor may then be evaporated, either by solar or artificial heat, for the production of the crude potassium chloride-magnesium chloride-bearing salt, and either or both the highly concentrated magnesium chloride liquor or solid (45%) magnesium chloride.

This evaporation may be carried on either by artificial heat, in large solar ponds, or in spray ponds; the latter method being considered preferable.

In the arid region in which these brines occur, it has been found possible to obtain a residual mother liquor containing in excess of 525 grams magnesium chloride per 1000 grams of water, by means of solar evaporation, without the use of artificial heat.

The residual liquid thus obtained may be further evaporated either by spray or by artificial heat for the production of solid magnesium chloride of commerce, or by cooling, a very desirable form of crystalline magnesium chloride may be obtained.

Any of the four forms of magnesium chloride-bearing materials, or any combination of the four, may be used as the "salting out" or replacement reagent for the production of the crude potassium chloride crystals. I prefer, however, to use magnesium chloride-bearing crystals containing as high a percentage as possible of magnesium chloride.

The magnesium chloride and water content of these crystals, on being mixed with the potassium chloride saturated brine from the first solar vats, goes into solution, forcing out of solution a portion of the sodium and potassium chloride contents of the original liquor, and leaving as an undissolved solid the potassium content of the original crystals. Owing to the relatively high percentage of potassium chloride and low percentage of sodium chloride in these crystals, the resulting crude potash salts obtained, contain a higher percentage of potassium chloride than is obtainable by the use of the other magnesium chloride-bearing reagents.

The excess of highly concentrated magnesium chloride residual liquor obtained during the months of the greatest heat and greatest evaporation is preferably stored in large tanks, and later during the colder months of the year, cooled to as low a temperature as possible, preferably by spraying, for the production of the crystalline $6H_2O$ hydrate of magnesium chloride

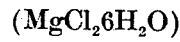
$(MgCl_2 6H_2O)$

The liquor resulting from the cooling process is a practically pure solution of magnesium chloride in water, and upon further evaporation yields a very high grade magnesium chloride, practically free from impurities.

The solid or crystalline forms of magnesium chloride are preferable to the concentrated residual liquor as a "salting out" reagent, inasmuch as they contain less water than the solution, and forming less of the "375 grams magnesium chloride" liquor and, therefore, by retaining a lesser bulk of potassium chloride in solution, force out a greater percentage from the original potassium saturated liquor obtained from the first solar or sodium chloride vats. In practice my method forces out practically all of the potassium chloride content in the original liquor, because magnesium chloride in concentrated form, either liquid or solid is added in sufficient quantity to produce that result. The exact quantity of magnesium chloride required will depend on the composition of the original liquor and will have to be determined in each case by a simple preliminary experiment in order to force out all of the potassium chloride content.

As previously stated, any of these forms of magnesium chloride or any combination of them may be successfully employed as the "salting out" or replacement agent.

This application is a continuation in part of my pending application, Serial Number 373,183, filed April 12, 1920, for method of recovering potassium chloride from brine.

Having thus described my invention, what I claim and desire to secure by Letters Patent is:

1. The method of recovering potassium chloride from brines containing chlorides of sodium, potassium and magnesium, consisting in evaporating said brine to obtain a liquor containing a higher percentage of potassium chloride than is contained in the original brine, and mixing the said liquor with magnesium chloride-bearing material in sufficient quantities to force or salt out practically all the potassium chloride content of said liquor.

2. The method of recovering crude potassium-bearing material from brines containing chlorides of sodium, potassium and magnesium, which consists in evaporating said brine to obtain a liquor containing a higher precentage of potassium than is contained in the original brine, mixing said liquor with sufficient magnesium chloride-bearing material to thereby force or salt out practically all the potassium chloride content of said concentrated liquor as a crude potassium chloride salt and freeing said crude potassium salt from the residual liquor.

3. The method of recovering potassium chloride from brines containing chlorides of sodium, potassium and magnesium, consisting in evaporating said brine until saturation with respect to potassium chloride is attained, mixing the potassium-saturated liquor with magnesium chloride, thereby forcing or salting out crude potassium chloride salt separating said salt from the residual liquor, and recovering potassium chloride from said crude salt.

4. The method of recovering potassium chloride from brines containing the chlorides of sodium, potassium and magnesium, consisting in evaporating said brine until saturation with respect to potassium chloride is substantially attained, and mixing the potassium-bearing liquor with magnesium chloride to thereby force or salt out crude potassium chloride salt and to produce a mother liquor of such composition as will upon further evaporation deposit crystals containing a considerable percentage of magnesium chloride.

5. The method of recovering potassium chloride from brines containing the chlorides of sodium, potassium and magnesium, consisting in evaporating said brine until saturation with respect to potassium chloride is substantially attained, mixing the potassium-saturated liquor with magnesium chloride to thereby force or salt out a portion of the potassium chloride content as a solid and to produce a mother liquor of such composition as will upon further evaporation deposit magnesium chloride-bearing crystals, recovering the potassium chloride from said crude salt, and finally employing said magnesium chloride-bearing crystals as a reagent in said salting out step of the method, for the recovery of additional quantities of potassium chloride.

6. The herein described method of producing a salt containing potassium chloride in solid form from brines containing chlorides of sodium, potassium and magnesium, said method comprising adding concentrated magnesium chloride to a liquor substantially saturated with potassium chloride, whereby to force or "salt out" from said liquor crude potassium chloride salt.

7. The method of recovering crude potassium bearing material from brines containing chlorides of sodium, potassium and magnesium, which consists in evaporating said brine to obtain a liquor containing a higher percentage of potassium chloride than is contained in the original brine, mixing said liquor with magnesium chloride to thereby dissolve the magnesium chloride and to force or salt out a portion of the sodium and potassium contents of the said liquor, separating the resulting sodium and potassium contents of the said liquor, separating the resulting sodium and potassium salts from their residual liquor, recovering magnesium chloride in solid form from said residual liquor and using said solids as the salting out agent for the second step specified herein.

8. The method of recovering potassium chloride from brines containing chlorides of sodium, potassium and magnesium, consisting in evaporating said brines to obtain a liquor containing a higher percentage of potassium chloride than is contained in the original brine, mixing the said liquor with sufficient concentrated magnesium chloride-bearing material to salt out the greater portion of the sodium and potassium contents of the said liquor, and to dissolve the magnesium chloride content of said magnesium chloride-bearing material, leaving as an undissolved solid the potassium content of the original magnesium chloride-bearing material, separating the resulting sodium and potassium salts from the residual liquor, recovering magnesium chloride in the form of concentrated magnesium chloride-bearing material from said residual liquor and using said magnesium chloride-bearing material as said salting out agent, for the purposes set forth.

9. The method of recovering potassium chloride from brine of the character described consisting in evaporating said brine until saturation in respect to potassium chloride is attained, mixing the potassium saturated liquor with magnesium chloride, thereby forcing or salting out crude potassium chloride salt, separating said salt from its mother liquor, washing said crude salt with said potassium chloride saturated brine, to thereby decrease the magnesium chloride content of the liquor adhering to said salt, and recovering potassium chloride from said crude salt.

10. The method of forcing or salting out of a solution containing chlorides of sodium, potassium and magnesium a potassium chloride-bearing salt, by adding magnesium chloride to said solution.

11. The method of recovering a salt containing solid potassium chloride, from a liquor that is approximately saturated with potassium chloride, said method consisting in mixing with said liquor magnesium chloride in concentrated form and in sufficient quantity to force out a salt containing substantially all the potassium chloride of said liquor.

In testimony whereof, I affix my signature.

JOSEPH L. SILSBEE.